United States Patent [19]

Rau et al.

[11] 4,033,417
[45] July 5, 1977

[54] AGRICULTURAL MACHINE

[75] Inventors: Willy Rau, Weilheim, Teck; Christian Taus, Kirchheim, Teck, both of Germany

[73] Assignee: Maschinenfabrik Rau oHG, Wilheim, Teck, Germany

[22] Filed: Apr. 2, 1975

[21] Appl. No.: 564,442

[30] Foreign Application Priority Data

Apr. 10, 1974 Germany .......................... 2417496
Sept. 12, 1974 Germany ..........................7430647

[52] U.S. Cl. .............................. 172/613; 172/180; 172/624; 172/629; 172/645; 172/646; 172/649; 172/655; 172/657; 172/673; 172/675; 172/676; 172/762; 172/763; 172/773; 403/396; 403/399; 403/400; 403/390; 403/391

[51] Int. Cl.² ........................................ A61B 65/00

[58] Field of Search .......... 172/619, 624, 626, 627, 172/629, 640, 645, 649, 655, 656, 673, 675, 676, 180, 181, 762, 763, 59, 406, 705, 646, 773, 650, 613, 657; 403/390, 391, 396, 399, 400

[56] References Cited

UNITED STATES PATENTS

| 49,111 | 8/1865 | Ingraham .......................... 172/697 |
| 457,964 | 8/1891 | Bolte .............................. 403/391 X |
| 982,912 | 1/1911 | West ............................... 172/656 X |
| 2,196,383 | 4/1940 | Buchanan ...................... 403/396 X |
| 3,325,227 | 6/1967 | Hunter ........................... 403/396 X |
| 3,774,688 | 11/1973 | Van Der Lely et al. ......... 172/59 X |

FOREIGN PATENTS OR APPLICATIONS

| 442,799 | 4/1926 | Germany .......................... 172/59 |
| 61,745 | 7/1924 | Sweden .......................... 172/645 |
| 409,646 | 8/1932 | United Kingdom ............... 172/180 |

*Primary Examiner*—Paul E. Shapiro
*Attorney, Agent, or Firm*—Michael J. Striker

[57] ABSTRACT

A support is connectable with an agricultural machine, and a plurality of agricultural tools is provided which are mounted by mounting elements on the support so that they can be adjusted relative to the support. A single arresting element is provided which arrests all of the tools in their respective positions. The tools have mounting portions extending into a passage in the support and either the passage itself or an auxiliary element in the passage has a wedge face to engage the tool mounting portions.

13 Claims, 8 Drawing Figures

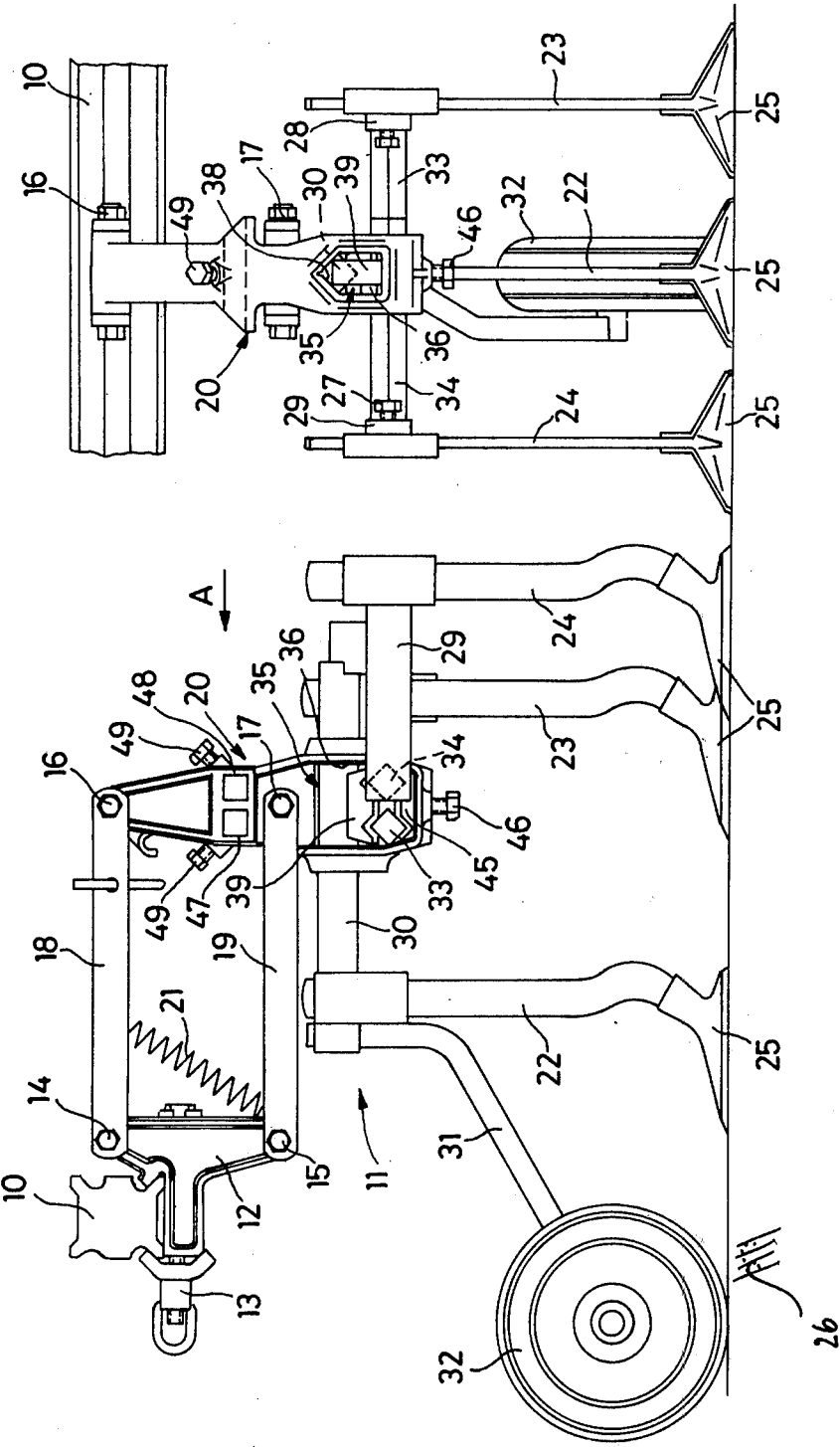

AGRICULTURAL MACHINE

BACKGROUND OF THE INVENTION

The present invention is concerned with an agricultural machine, and more particularly with an agricultural which must be capable of being adjusted relative to one another.

There are agricultural machines, for example machines which are used for tending root crops, or generally for crops which are planted in rows or furrows, in which the machine must have a plurality of agricultural tools, for example one for each row. Usually, such machines are of a type which can be connected with a tractor, although they could, of course, be fixedly mounted on the tractor per se. Conventionally, this type of agricultural machine has three tools which are offset relative to one another, two of them being spaced from one another transversely of the direction in which the machine moves in operation, and a third tool being located substantially midway between these tools and being located either forwardly of them or rearwardly, as seen with respect to the advancement of the machine. These tools must each be individually removably connected with the machine in order to make it possible to exchange the individual tool in the event of wear or damage. Moreover, the tools must be capable of being adjusted with reference to one another, so that the machine can be accommodated for different spacing between adjacent furrows, or to permit an adjustment of the spacing between the adjacent tools in accordance with the particular root crop being tended. Heretofore, each of the tools in these prior-art machines was separately mounted in the machine for adjustment with reference to the other tools. This, of course, required a substantial amount of labor when adjustments had to be carried out, or when one or more of the tools had to be removed for replacement, inspection or the like, or when a different type of tool had to be substituted. Aside from the labor-intensive and time-consuming character of such manipulations, there was, of course, the further fact that during the manipulations the machine could not be used.

SUMMARY OF THE INVENTION

Accordingly, it is a general object of this invention to overcome the aforementioned disadvantages of the prior art.

More particularly, it is an object of the present invention to provide an improved agricultural machine of the type in question, which is not possessed of these disadvantages.

Still more particularly, it is an object of this invention to provide an improved agricultural machine of the type in question wherein adjustments and/or removal or replacement of tools can be carried out in a simple and highly efficacious manner, with a minimum loss of time.

In keeping with these objects, and with others which will become apparent hereafter, one feature of the invention resides in an agricultural machine which, in combination comprises support means, a plurality of agricultural tools, mounting means mounting the tools on the support means with freedom of adjustment to respective selected positions, and a single arresting element for arresting all of the tools in their respective selected positions.

The novel feature which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view of an agricultural machine according to one embodiment of the invention;

FIG. 2 is a view of FIG. 1 as seen in the direction of the arrow A;

DESCRIPTION OF THE PREFERRED EMBODIMENTS

Figures 3, 4:
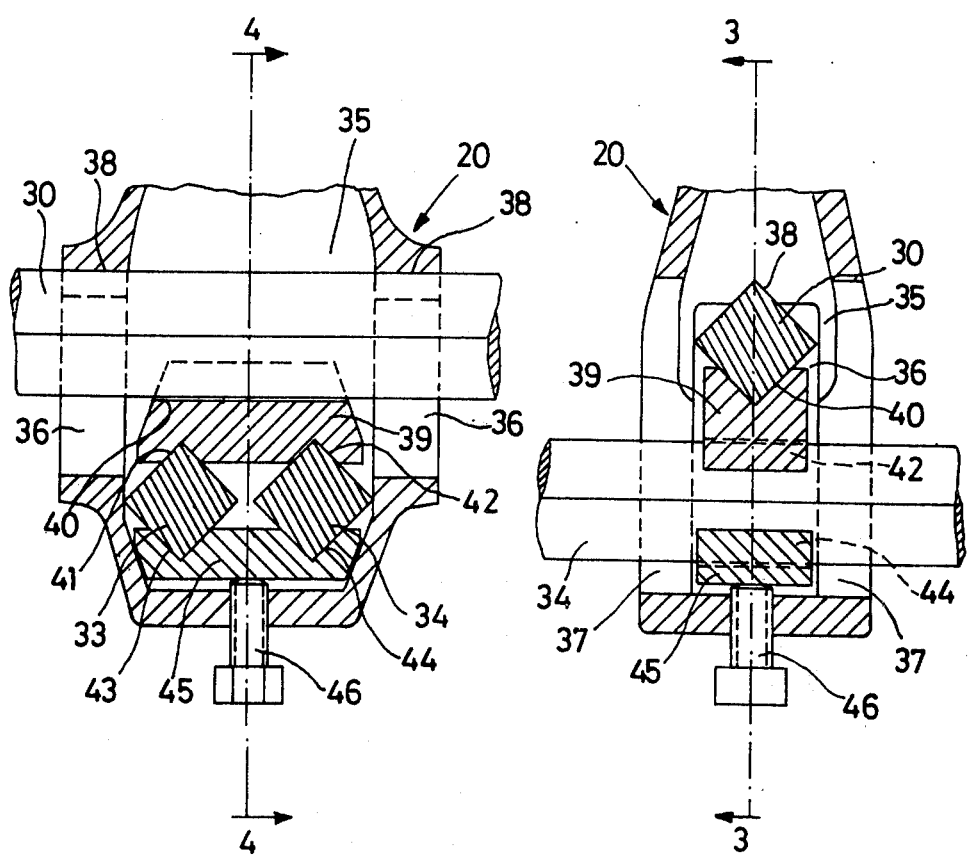
FIG. 3 is an enlarged-scale detail view showing a detail of FIG. 1 in a section taken on line 3—3 of FIG. 4.
FIG. 4 is a section taken on line 4—4 of FIG. 3.

Referring firstly to the embodiment in FIGS. 1-4, it will be seen that reference numeral 10 identifies a cross beam of profiled contour; this beam 10 may be connected in conventional manner to a tractor or other device capable of moving the machine of FIGS. 1-4 in leftward direction in FIG. 1. The cross beam 10 is adapted for connection to it of various different types of agricultural machines, such as the agricultural machine of the present invention, for example the embodiment thereof illustrated in FIGS. 1-4 and generally identified with reference numeral 11.

This machine is illustrated as an agricultural machine of the type which is required when a plurality of laterally adjacent furrows is to be treated. To connect the machine 11 to the cross beam 10, the machine 11 is provided with a coupling 12 which engages the cross beam 10 and is connected thereto by means of a screw 13. A parallelogram linkage having two arms 18 and 19 and four pivots 14, 15, 16 and 17 is connected to the coupling 12; a support structure 20 in turn is connected to the parallelogram linkage so as to be carried by the same. A restoring spring 21 is connected to the pivot 15 and to the arm 18 and permanently tends to move the parallelogram linkage to its illustrated position. It will be appreciated, as is to be explained subsequently, that in the event of uneven soil contours the linkage and indeed the entire machine 11 may be temporarily displaced upwardly by operation of the linkage, and the spring 21 will then restore the arrangement to the position shown in FIG. 1.

The illustrated machine 11 has a plurality of agricultural tools each adapted to operate upon one furrow in the ground, the latter being diagrammatically shown and identified with reference numeral 26. In the embodiment of FIGS. 1-4, three such tools are provided, being identified with reference numerals 22, 23 and 24, respectively. Each of the tools carries at its lower end a blade 25, here seen to be of triangular configuration which serves the purpose of working the soil 26. Two of the tools, namely the tools 23 and 24, are spaced transversely of one another and in the direction of movement of the machine. The arrow A in FIG. 1, which indicates the direction in which the view of FIG. 2 is taken, is also indicative of the direction of movement of the machine. Each of the tools 23 and 24 extends through a sleeve of a respective member 28 and 29 and can be moved upwardly or downwardly in the respective sleeve and arrested in a selected position by means of a screw 27 (compare the FIG. 2). Thus, the height of the blades 25 can be adjusted with reference to the ground 26. The tool 22, which is located approximately in the central vertical plane of the machine 11, i.e., substantially midway between the tools 23 and 24, is located either ahead of (as shown) or rearwardly of the tools 23, 24. It is connected to a member 30 which in the illustrated embodiment is in form of a rectangular bar. Again, this tool 22 also can be raised and lowered. Also secured to the member 30 is an angled arm 31 which carries at its lower end a ground tracing roller 32 which rolls on the ground and, when it encounters a variation in the contour of the ground surface, either exerts upward pressure upon the machine 11 thereby pivoting the parallelogram linkage upwardly, or permits the machine 11 to drop downwardly, under simultaneous downward pivoting of the parallelogram linkage. In any case, the roller 32 assures that the blades 25 will always be at an identical vertical spacing from the ground surface. This assures, for example, that the blades 25 will always cut off a crop item at a certain spacing above the ground. The spacing of the roller 32 forwardly of the tools 22-24 is constant. tangular cross section. The support 20 is provided at a level below the pivots of the parallelogram linkage with a recess or passage 35 having openings 36 which face in the direction of the arrow A and also openings 37 which face transversely to this direction. The upper wall 38 bounding the passage 35 has a triangular shape as shown in FIG. 2, corresponding approximately or identically to the cross section of the member 30 when the latter is to turned that its quadratic cross section stands on edge, as indicated by the broken lines in FIG. 2. The member 30, of course, is received in this portion of the passage, as is evident from FIG. 2; FIGS. 1 and 2 show that the member 30 has been inserted into the passage 35 from the front one of the openings 36 and extends outwardly through the rear one of the openings 36.

Within the passage 35 the member 30 abuts from below against an insert 39 which for this purpose is provided with a groove 40 of triangular cross section so that a portion of the member 30 can be matingly received in it, as shown in FIG. 4, thereby assuring that the member 30 is firmly held by the groove 40 and the triangular portion formed by the upper wall 38. The insert 39, in turn, engages with its downwardly facing side the two members 33 and 34 which carry the tools 23 and 24. These members 33 and 34 extend into the passage 35 in direction transversely to the direction indicated by the arrow A (compare FIGS. 1 and 2) and are located in a common horizontal plane. The lower side of the insert 39 is provided with two parallel grooves 41 and 42 which extend transversely to the direction indicated by the arrow A and each of which engages a portion of one of the members 33, 34. Beneath the members 33, 34 a support member 45 is provided which is formed with grooves 43, 44 of triangular cross section and in which again a portion of each of the respective members 33, 34 is received. A screw 46 is threaded into a tapped bore in the support 20, pressing from below against the support member 45 so that the latter presses upwardly against the members 33, 34 and the latter then press the member 30 against the wall 38 via the insert 39.

In effect, the members 30, 33 and 34 thus constitute a unit together with the insert 39 and the support member 45. The arresting of the members 30, 33 and 34 against movement relative to one another is effected by a single arresting element, namely the screw 46. It follows from this that when the screw 46 is loosened, the member 30 can be slid in the direction of the arrow A (or, of course, opposite to it) and the members 33, 34 can be similarly shifted in direction transversely thereto. Since each of these members carries one of the tools, the tools can thereby be adjusted in their position relative to one another until a desired setting has been obtained. Thereupon, the screw 46 is tightened again and the entire arrangement is locked or arrested against movement by this single operation. Evidently, instead of merely shifting the members 30, 33 and 34, they could also be pulled out of the passage 35, thus permitting inspection and removal of the respective tools, their replacement with others, or their repair. It is also clear that whenever the screw 46 is loosened, it is possible to adjust only a single one of the tools (or to remove or replaced it), or to adjust two or more at the same time.

For the installation of the tools 22-24, it is advantageous to first insert the member 30 through the two registering openings 36 into the support 20, and thereupon to insert the insert 39 and the members 33 and 34 through one of the registering openings 37. After the tools have been set to the desired relative positions, the screw 46 is tightened and arrests all of the tools in these positions at one and the same time.

The support 20, as well as the insert 39 and the support member 45, may--but need not--be made as a casting. In any event, however, the support 20 is provided in its upper region intermediate the pivots 16 and 17 with two or more further openings 47, 48 which extend transversely to the direction indicated by the arrow A and which are advantageously of polygonal (e.g., quadratic) cross section. Transverse bars can be inserted into these openings 47 and 48 and be arrested by means of screws 49. Additional tools, for example laterally located harrow discs, may then be mounted on these bars.

A further embodiment of the invention is illusgrated in FIGS. 5-8. In this embodiment, the support corresponding to the support 20 of FIG. 1, is identified with reference numeral 110. It has two shackles 111 and 112 by means of which it may be connected (in a manner known per se) via two vertically spaced arms to a tractor or the like. It can also be connected to a frame which in turn may be connected to a three point linkage of the tractor.

Figure 5:
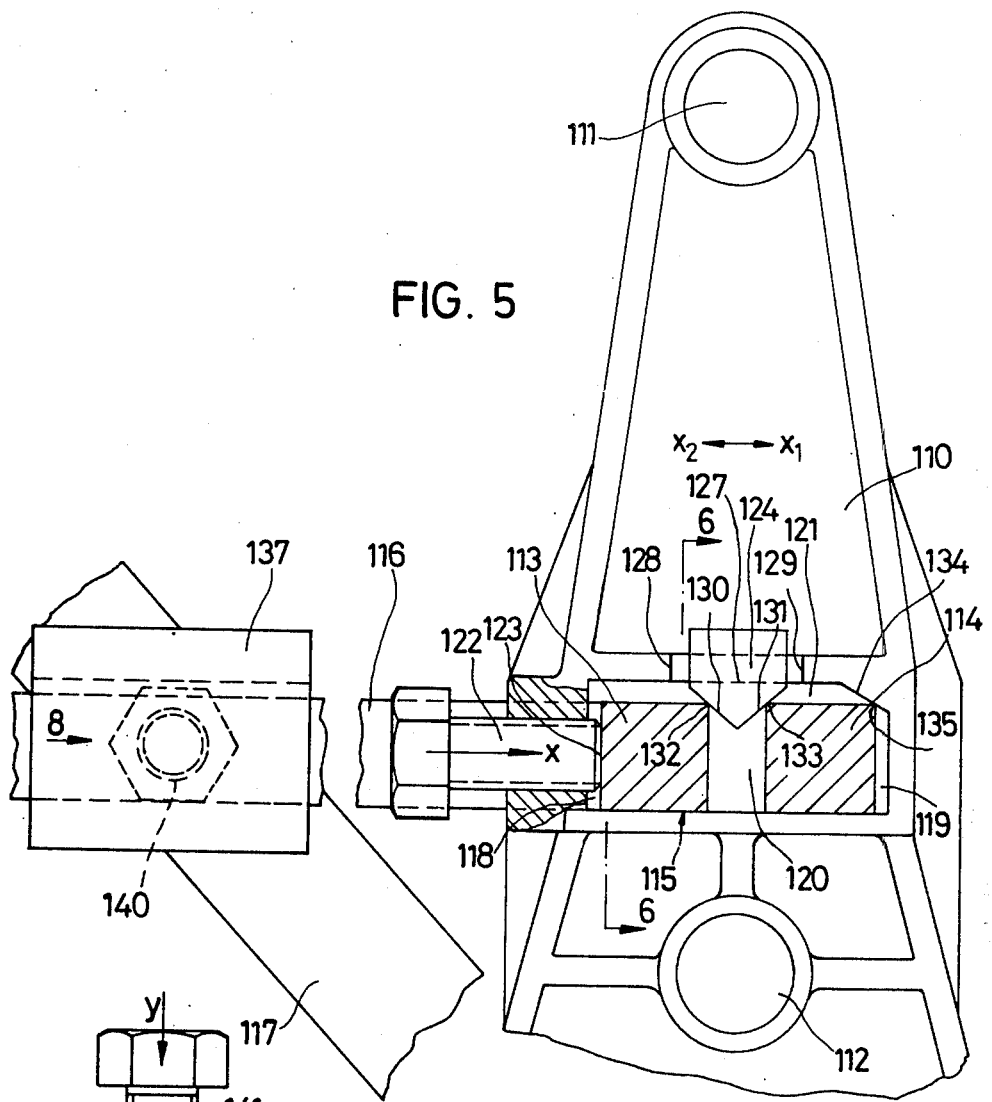
FIG. 5 is a fragmentary partly sectioned side view of a further machine according to the present invention.

The support 110 is provided with a transversely extending channel-shaped passage 115 into which two bar-shaped mounting members 113 and 114 are inserted. Each of the members 113, 114 has an angled-off arm 116 of which one is shown in FIG. 5. This is the arm of the member 113. The corresponding arm of the member 114 is not shown in FIG. 5 but should be understood to be located forwardly of the plane of the drawing, extending in parallelism with the arm 116 of the member 113. The arms 116 serve for connection of a tool carrier 117 in the manner to be described subsequently.

The cross-sectional dimensions of the passage 115 are larger than would be required merely for the insertion of the members 113, 114, as is clearly shown in FIG. 5. Specifically, at the opposite sides of the members 113, 114 there remain two gaps 118 and 119; between the members 113 and 114 there remains a gap 120 and above the members 113, 114 there remains a gap 121.

Figure 6:
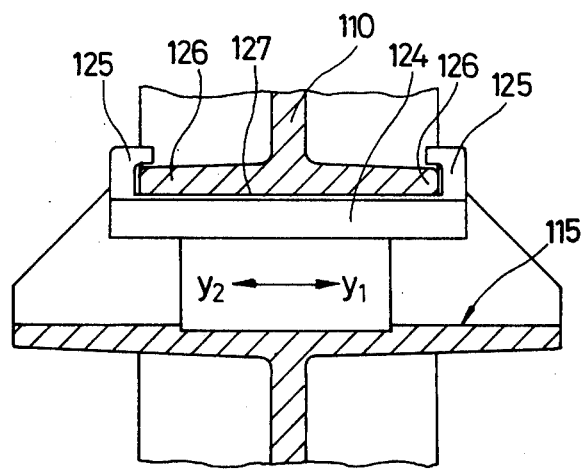
FIG. 6 is a section on line 6—6 of FIG. 5, with some portions omitted for the sake of clarity.
Figure 7:
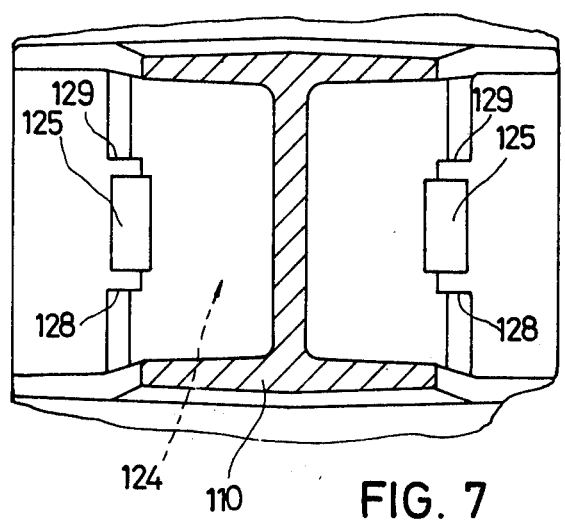
FIG. 7 is a top-plan view of FIG. 6.

A common signal arresting element 122 is provided in this embodiment, again in form of a screw which has a leading end face 123 that is planar or substantially planar and which engages a juxtaposed side face of one of the members (here the member 113) in surface-to-surface relationship. A wedge-shaped member 124 extends into the passage 115 so that its tip projects into the gap 120 between the members 113 and 114. As FIGS. 6 and 7 show most clearly, the opposite longitudinal ends (as seen in directional normal to the plane of FIG. 5) of the member 124 are bent over to a U-shaped configuration, as indicated at 125, so as to engage wall portions 126 of the support 110. This assures that the member 124 is in tight contact with the guide wall 127 of the support 110, but nevertheless has freedom of limited movement in direction transversely to its elongation, as indicated by the double-headed arrow $x_1$-$x_2$. The extent of such displacement is limited by abutments 128 and 129 which are formed in wall portions of the support 110.

As shown in FIG. 5, the member 124 is provided with two mutually inclined wedge faces 130 and 131 which together resembled the letter V. The purpose of the wedge faces 130 and 131 is to engage the upwardly directed longitudinally extending edges 132 and 133 of the members 113 and 114, respectively. A further wedge face 134 is provided on the inner circumferential surface bounding the passage 15 and is located opposite the longitudinally extending edge 135 of the member 114.

It is currently preferred that the wedge angle included between either of the wedge faces 130, 131 and the direction of the arrow $x$ in which the screw 122 exerts pressure, be greater than the wedge angle included between the wedge face 134 and this same direction.

It will be appreciated that in this embodiment a turning of the screw 122 in a sense causing it to become displaced towards the right in FIG. 5, will exert pressure in the direction of the arrow $x$ upon the side face of the member 113. This causes the member 113 to be pressed with its edge 132 into engagement with the wedge face 130 and to press the member 124 with its wedge face 131 into engagement with the edge 133 of the member 114. In turn, the edge 135 of the member 114 is pressed into engagement with the wedge face 134. The inclination of the wedge faces 130 and 131 assures further that the members 113 and 114 are firmly pressed against the bottom wall bounding the passage 115, and any freedom of movement of the members 113, 114 in direction of the arrow $x$ or opposite to it, or in the direction normal to the aforementioned direction, is thereby reliably precluded.

Since there is surface-to-surface contact between the end face 123 of the screw 122 and the juxtaposed side face of the member 113, the pressure to be exerted can be relatively low. Although there is lined contact between the edges 132, 133 and 135 and the wedge faces 130, 131 and 134, disadvantageous damage is avoided since the line contact extends over the entire length of the wedge faces 130, 131 and 134 and the pressure is thus sufficiently distributed.

When the screw 122 is tightened and exerts pressure in the direction of the arrow $x$, the member 124 will, of course, shift to the right in FIG. 5 under the urging of the member 113 which is pushed by the screw 122, until any play that previously existed in the system has been eliminated. Evidently, it is possible to use only a single one of the members 113, 114; is so, the member 114 is omitted. Since the member 113 and the member 124 can be displaced in the direction of the arow $x$ only to a limited extent, due to the presence of the abutment 129, the member 113 will be properly fixed in position and arrested against any movement as soon as the member 124 engages the abutment 129.

Figure 8:
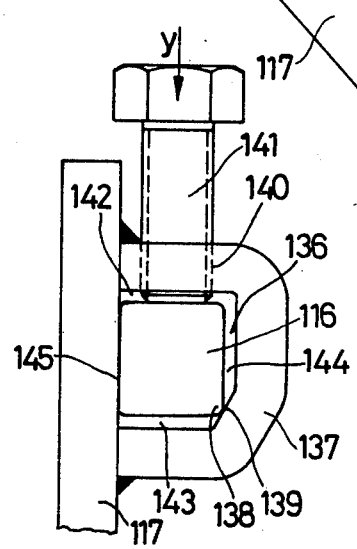
FIG. 8 is a view of FIG. 5 as seen in the direction of the arrow 8 thereof.

To connect the tool carrier 117 with one or both of the arms 116, as shown at the left-hand side of FIG. 5 and also in FIG. 8, the respective arm 116 extends through an opening 136 provided in a bracket 137 that is rigidly connected (e.g., by welding) with the tool carrier 117. Each arm 116 will, of course, be connected with a separate tool carrier 117. The opening 136 is bounded by a wedge face 139 adapted to engage an edge 138 of the associated arm 116, and the bracket 137 is provided with a tapped bore 140 into which a screw 141 is threaded. The cross-sectional dimension of the opening 136 is so selected that gaps 142, 143 and 144 remain at three sides of the inserted arm 116 which, as shown by way of example, may have quadratic cross section. When the screw 141 is tightened, it exerts pressure in the direction of the arrow $y$ upon the arm 116, pressing the same against the wedge face 139 and also against a guide surface 145 and fixing it in position relative to the bracket 137 aganst displacement.

It will be appreciated that wherever a cooperation of edges and wedge faces has been described in the preceding embodiments, the relationship could be reversed, i.e., the wedge face might be provided where an edge has been described and an element described as having a wedge face might instead be provided with an edge. Wherever any edges are rounded or beveled, the degree of rounding or of the bevel could be different from that illustrated, and also the wedge angles of the wedge faces might be different. Where sharp edges have been shown, as for examples in connection with the members 113, 114 in FIG. 5, they could be rounded or beveled, but this would require an additional manufacturing step which is not really necessary for purposes of the invention.

In those embodiments, as in FIGS. 1–4, where different ones of the mounting members (e.g., the mounting members 34 and 30) are located in different planes and/or are transversely spaced from one another, the spacing between them will remain constant despite the fact that any or all of these members are moved relative to one another in order to obtain a change in the relative position of the tools which they carry. The insert 39 is very advantageous because it provides for excellent pressure transmission and fixing of the mounting members. However, it is conceivable to omit the insert 39 and to have the mounting members directly engage one another, for example providing the mounting members themselves with portions which interengage. However, where the mounting members are provided with recesses in such case, they would be weakened which might not be desirable. In the embodiment of FIGS.

5–8, it is conceivable to omit one of the wedge faces of the member 124.

It will be understood that each of the elements described above, or two or more together, may also find a useful application in other types of constructions differing from the type described above.

While the invention has been illustrations and described as embodied in an agricultural machine, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic of specific aspects of this invention.

What is claimed as new and desired to be protected by Letters Patent is set forth in the appended claims.

1. In an agricultural machine, a combination comprising support means formed with a passage; an agricultural tool; mounting means mounting said tool on said support means with freedom of adjustment to respective selected positions and comprising at least one bar-shaped mounting member received in said passage, said passage having an inner longitudinally extending wedge face and said mounting member having a longitudinally extending edge portion; and an arresting element so arranged as to engage said mounting member with its edge portion against said wedge face for arresting said mounting member in its respectively selected positions in said passage.

2. In an agricultural machine, a combination comprising support means having a passage; a plurality of agricultural tools; mounting means mounting said tools on said support means with freedom of adjustment to respective selected positions, said mounting means comprising at least one bar-shaped mounting member received in said passage; a wedgeshaped member having wedge faces extending into said passage transversely of the elongation thereof; and a single arresting element for arresting all of said tools in their respectively selected positions, aid arresting element pressing said mounting member against one of said wedge faces.

3. A combination as defined in claim 2, wherein said arresting element is a screw.

4. A combination as defined in claim 2, further comprising a parallelogram linkage connected with said support means for securing the same to a frame of the machine for upward yielding of said support in correspondence with variations in the contour of the ground over which the machine moves.

5. A combination as defined in claim 4, said parallelogram linkage having four pivots; and wherein said passage is located at a level lower than said pivots.

6. A combination as defined in claim 2, said mounting member having a longitudinally extending edge portion which is pressed against said one wedge face; and wherein said arresting element engages a longitudinally extending surface of said mounting member which faces away from said edge portion.

7. A combination as defined in claim 6, wherein said mounting member is of quardratic cross section.

8. A combination as defined in claim 2, said mounting means further comprising an additional bar-shaped mounting member laterally of and extending to the first-mentioned mounting member, said wedge faces of said wedge-shaped member converging toward one another to form a wedge tip which extends between said mounting members so that each of said wedge faces engages one of said mounting members.

9. A combination as defined in claim 8, one of said mounting members having an edge portion engaged by one of said wedge faces, and a surface which faces away from said edge portion; and wherein said arresting element exerts pressure upon said surface transversely of the elongation of said mounting members, pressing said edge portion against said one wedge face and pressing the other wedge face against the other mounting memfber and the latter against an inner surface of said passage.

10. A combination as defined in claim 9, wherein said wedge faces are mutually inclined in V-shaped configuration.

11. A combination as defined in claim 9, wherein said inner surface is also a wedge face, and the wedge angle included between said inner surface and the direction in which said arresting element exerts pressure is smaller than the wedge angle included between said direction and at least one of said wedge faces of said wedge-shaped member.

12. A combination as defined in claim 9, wherein said wedge-shaped member is mounted with freedom of movement in and opposite to the direction in which said arresting element exerts pressure; and further comprising abutments limiting the movement of said wedge-shaped member.

13. A combination as defined in claim 12, said wedge-shaped member being elongated in direction lengthwise of said mounting members and having spaced ends provided with guide portions engaging said support means so as to guide said wedge-shaped member for said limited movement thereof.

* * * * *